United States Patent [19]

Kuchuk-Yatsenko et al.

[11] Patent Number: 5,117,084
[45] Date of Patent: May 26, 1992

[54] METHOD FOR PRESSURE WELDING OF PARTS HEATED WITH AN ARC MOVING IN MAGNETIC FIELD

[76] Inventors: Sergei I. Kuchuk-Yatsenko, ulitsa P. Osipenko, 17, kv. 18; Vadim J. Ignatenko, Ulitsa Boichenko, 13, kv. 45; Igor A. Genis, ulitsa Nischinskogo, 5, kv. 39; Viktor V. Jumatov, ulitsa Krasnoarmeiskaya, 51, kv. 46; Valery G. Krivenko, Ulitsa Melnikova, 18, kv. 58; Petr V. Kuznetsov, ulitsa Demeevskaya, 53, kv. 48; Vladimir S. Kachinsky, ulitsa N. Krasnova, 8, kv. 53, all of Kiev, U.S.S.R.

[21] Appl. No.: 576,412
[22] PCT Filed: Jan. 26, 1990
[86] PCT No.: PCT/SU89/00025
§ 371 Date: Sep. 25, 1990
§ 102(e) Date: Sep. 25, 1990
[87] PCT Pub. No.: WO90/08617
PCT Pub. Date: Aug. 9, 1990
[51] Int. Cl.⁵ .............................. B23K 9/08
[52] U.S. Cl. ........................... 219/100; 219/123
[58] Field of Search ............... 219/97, 100, 101, 104, 219/123

[56] References Cited

U.S. PATENT DOCUMENTS 3,484,578 12/1969 Sciaky .................................. 219/97
4,319,123 3/1982 Pache et al. ...................... 219/123

FOREIGN PATENT DOCUMENTS 129179 1/1978 German Democratic Rep. .
141798 5/1980 German Democratic Rep. .
2094694 3/1982 United Kingdom .

OTHER PUBLICATIONS

ZIS-Mitteilungen (DDR, No. 10, 1982, s. 1051-1055).

Primary Examiner—Clifford C. Shaw
Attorney, Agent, or Firm—Lilling and Lilling

[57] ABSTRACT

A method for pressure welding of parts with heating with an arc moving in magnetic field in which the parts (2,3) are placed coaxially with each other with a working gap (δ) between their ends magnetic field is created in the gap (67) and electric arc (6) is fired to heat the ends of the parts (2,3). A d-c component of voltage of the arc (6) is measured, and when this component reaches its minimum value corresponding to a temperature of the ends of the parts (2,3) at which plastic deformation of the material of the parts can occur, a pulsed increase in the arc current is carried out, with subsequent upsetting of the parts (2,3).

4 Claims, 2 Drawing Sheets

METHOD FOR PRESSURE WELDING OF PARTS HEATED WITH AN ARC MOVING IN MAGNETIC FIELD

TECHNICAL FIELD

The invention relates to the pressure welding, and more specifically to a method for pressure welding with heating with an arc moving in magnetic field.

BACKGROUND OF THE INVENTION

A special problem arises in welding small-diameter pipes which cannot be rotated during welding, e.g. during installation of pipelines where it is necessary to ensure stability of welding quality with the achievement of high productivity. These pipes are welded nowadays mainly manually using coated electrodes, or welding is performed in shielding gases. The number of welded joints largely depends on the welder skill, quality of materials and welding conditions. A change in position of the welding zone on space during transition from the top point of the weld to the bottom point thereof complicates the process as it is necessary to correct welding conditions.

To avoid errors characteristic of the manual welding, microprocessor controlled welders are used in certain applications. This results in an increase in the number of welded joints and results in a certain improvement of productivity, the cost of welding equipment increases, and requirements imposed on skill of the operating personnel are more stringent, certain restrictions being imposed upon operating conditions of the equipment (e.g. ambient temperature, dust lading and humidity of air).

In certain applications a continuous flash butt welding is used which ensures stability of quality of welded joints with a high level of automation of the process. This welding method can be used both at factories and in the field. However, welded joints produced by this method are characterized by the presence of irregularly shaped flash having sharp projections and collars which forms on both outer and inner surfaces of the pipeline. The flash on the inner surface of the pipeline is to be removed as it reduces the cross-section thus causing resistance to fluids moving through the pipeline. The removal of such flash is generally carried out by means of cutting tools attached to a bar which is very difficult and can only be made at straight portions of the pipeline.

Methods of welding with an arc moving in magnetic field which are most promising and productive have recently come into use for welding small-diameter pipes.

Known in the art is a method for pressure welding with heating with an arc moving in magnetic field (DD, A, 129179), comprising placing parts being welded, e.g. pipes coaxially with each other with a working gap defined between their ends, a permanent magnetic field being created in the gap, and firing an electric arc which moves along the perimeter of the ends under the action of the permanent magnetic field. At the beginning of the process, the arc current is set up in such a manner that the ends of the parts being welded be heated to a temperature of plastic deformation, which is followed by a pulsed increase in the arc current and upsetting.

In the abovedescribed method, the time for heating the ends to the temperature of plastic deformation is set up in advance without taking into account eventual deviations of the arc current or dimensions of the parts being welded, e.g. diameter or wall thickness of the pipes being welded. This negatively affects stability of quality of welded joints. Such deviations are not taken into account either when a fixed value of the duration of a pulsed increase in the arc current is set up. In addition, the prior art method does not allow local changes in the gap caused by non-parallelism of the ends and their irregular shape to be determined. As a result, the resultant welded joint may have local defects.

Welding conditions, which are generally determined as a result of a number of trial weldings, should be varied in changing over for welding of parts of different size which involves much time and energy expeses.

Therefore, the prior art method for welding with heating with an arc moving in magnetic field cannot guarantee stability of quality of a welded joint.

Known in the art is a method for pressure welding of parts with heating with an arc moving in magnetic field (ZIS-Mitteilungen (DDR, No. 10, 1982, s.1051-1055), comprising placing parts being welded coaxially with each other with a working gap between their ends, an electric arc being fired in the gap, creating magnetic field in the gap, the electric arc moving along the perimeter of the ends of the parts being welded under the action of the magnetic field to heat the parts to a temperature of plastic deformation of the material of the parts being welded, determining the moment at which this temperature is reached, and beginning a pulsed increase in the electric arc current from this moment to a value at which temperature of the ends of the parts being welded reashes the melting point of the material of the parts being welded, with subsequent upsetting of the parts being welded.

In the prior art method, the moment of heating of the ends to the temperature of plastic deformation is determined by the amount of thermal energy stored in the ends of the parts being welded, e.g. pipes. The amount of thermal energy is, in turn, determined using a computer which measures current and voltage of the electric arc and carries out readings of the amount of thermal energy every 0.1 s.

It should be, however, noted that the amount of energy calculated on the basis of the measured current and voltage of the electric arc is practically the energy released from the arc. It is only a part of this energy that is stored in the ends of the pipes, and this part substantially depends on conditions of heat exchange with the environment (ambient temperature, presence of wind, eventual contact between the pipes being welded and structural members having a high heat conductivity, and the like) and is not always confident.

Therefore, one cannot judge on the amount of energy stored in the ends of the parts being welded by the calculated amount of energy.

In addition, the duration of the pulsed increase in current in the prior art method is set up in advance without taking into account eventual deviations of the degree of heating of the ends of the parts being welded.

Upon a change in size of the parts being welded, it is necessary to put in the computer the data corresponding to the new value of thermal energy after overpassing of which a pulsed increase in current should be carried out.

Inspite of the employment of a sophisticated electronic equipment in the system controlling the welding process, the method cannot ensure the measurement of a local amount of gap and cannot guarantee high stability of quality of welded joints. In addition, highly-skilled personnel should be employed for operation of the apparatus for carrying out this prior art welding method, and operating conditions are restructed to certain ambient temperature ranges and conditions of the environment.

SUMMARY OF THE INVENTION

The main object of the invention is to provide a method for pressure welding of parts heated with an arc moving in a magnetic field wherein the moment of time at which the temperature of the ends of welded parts is essentially equal to the temperature of plastic deformation of the material of welded parts is determined by measuring the changes in the linear dimensions of the parts being welded which would permit correcting the melting conditions and dimensions of the parts being welded, thus ensuring quality of the welded joints.

This object is accomplished by that in a method for welding parts with heating with an arc moving in magnetic field, comprising placing parts being welded coaxially with each other with a working gap defined between their ends, an electric arc being fired in the gap, creating magnetic field in the gap, the electric arc moving along the perimeter of the ends of the parts being welded under the action of the magnetic field to heat them to a temperature of plastic deformation of the material of the parts being welded, determining the moment at which this temperature is reached, carrying out a pulsed increase in current of the electric arc beginning with this moment to a value at which temperature of the ends of the parts being welded reaches the melting point of the material of the parts being welded, and upsetting the parts being welded, according to the invention, the time moment at which temperature of the ends of the parts being welded is substantially equal to the temperature of plastic deformation of the material of the parts being welded is determined by measuring a d-c component of voltage of the electric arc, a minimum value of this d-c component being set up at which temperature of the ends of the parts being welded is substantially equal the temperature of plastic deformation of the material of the parts being welded, and when the d-c component of voltage of the electric arc reaches its minimum value, the pulsed increase in current of the electric arc is carried out.

It is preferred that a maximum value of the d-c component of the electric arc be set up at which fusion of the end of the parts being welded occurs, the parts being upset when the d-c component of voltage of the electric arc reaches its maximum value.

The amount of a local gap along the perimeter of the ends of the parts being welded is preferably determined during the time interval between firing of the electric arc and the moment at which the d-c component of voltage of the electric arc reaches its minimum value, the electric arc being extinguished when the amount of local gap goes beyond the limits of the working gap, the parts being welded are axially moved closer to each other until their ends touch each other for a time necessary for their cooling down to a temperature below the temperature of plastic deformation of the material of the parts being welded, and the parts being welded being spaced apart to the amount of the initial working gap, the electric arc being then refired.

It is preferred that the amount of local gap along the perimeter of the ends of the parts being welded be determined by measuring an a-c component of voltage of the electric arc for which a limit value is set up which corresponds to the amount of local gap going beyond the limits of the working gap.

The method for pressure welding according to the invention ensures high stability of quality of welded joints taking into account eventual deviations of dimensions of parts being welded and parameters of the welding process. No sophisticated automatic control systems based on computer equipment are required so that the welding equipment operating conditions and operating personnel would not call for compliance with special requirements.

At the same time, preliminary adjustment of welding conditions is facilitated, and there is no need to use a large number of real samples for working out welding conditions. Therefore, a rapid readjustment of a plant for carrying out the method according to the invention can be effected in changing over for welding of parts with different dimensions. The method ensures an automatic correction of welding conditions upon a change in transverse dimensions of the parts being welded within the range of up to 1.5 times.

BRIEF DESCRIPTION OF THE DRAWINGS

The invention will now be described with reference to specific embodiments illustrated in the accompanying drawings, in which.

BEST MODE FOR CARRYING OUT THE INVENTION

Figure 1:
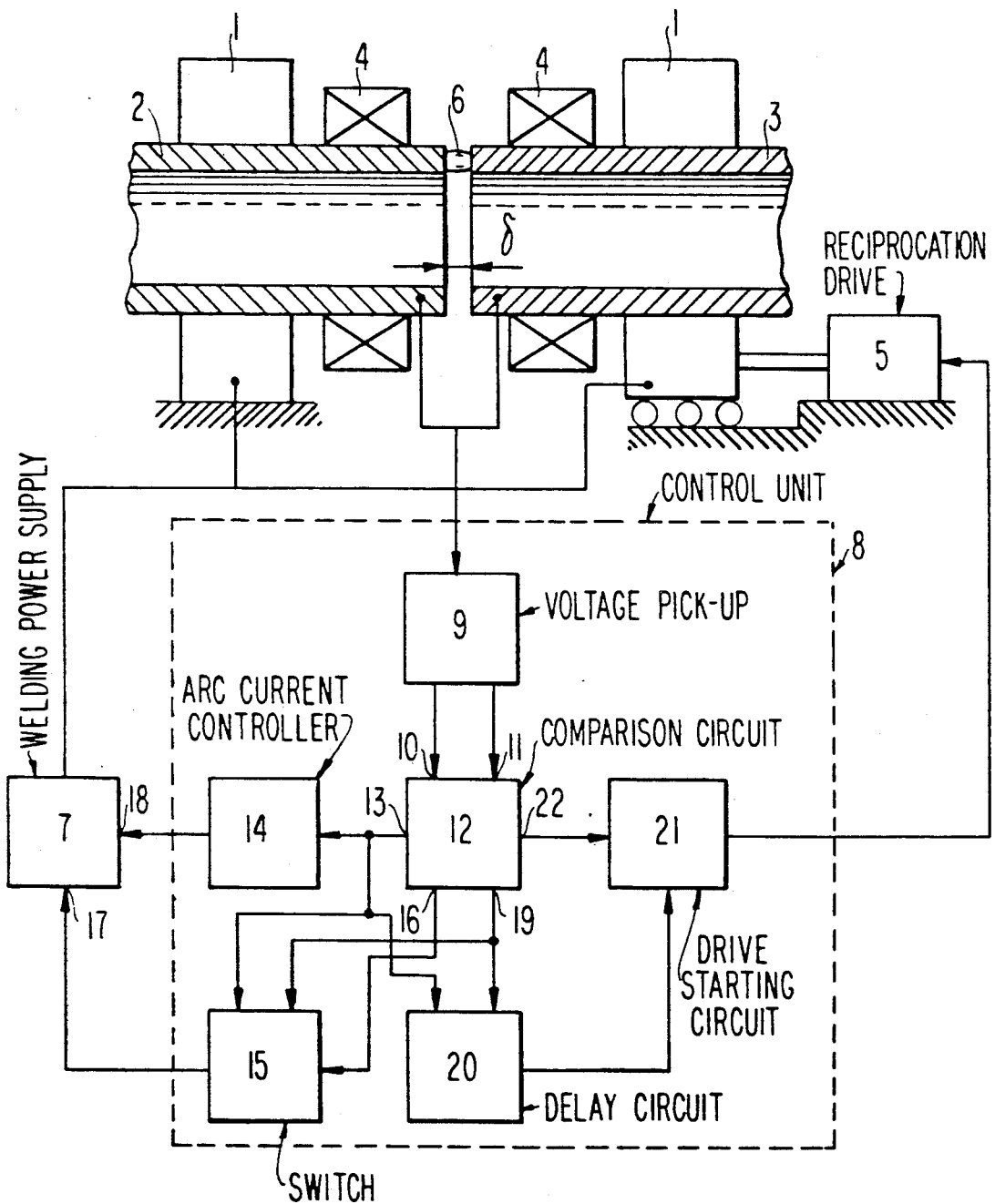
FIG. 1 schematically shows an apparatus for carrying out a method for pressure welding of parts with heating with an arc moving in magnetic field and a control unit.

A method for pressure welding with heating of parts with an arc moving in magnetic field may be carried out using a conventional plant having two clamping devices 1 (FIG. 1) in which parts 2,3 of a closed cross-sectional configuration, e.g. pipes are placed coaxially with each other. Magnets 4 (permanent magnets or electromagnets) are provided outside the parts 2,3 being welded along the perimeter thereof and adjacent to the ends thereof. The part 3 is mounted for an axial movement with respect to the part 2, the movement being imparted by means of a reciprocation drive 5.

An electric arc 6 is schematically shown between the ends of the parts 2,3 being welded.

The plant comprises a welding power supply 7 which may be in the form of a rectifier having a drooping voltampere characteristics which has its output terminals connected to the clamping devices 1. The plant has a control unit 8 which generates output signals acting upon the reciprocation drive 5 and welding power supply 7. The control unit 8 comprises a voltage pick-up connected to the ends of the parts 2,3 being welded. A d-c component $U_a$ and an a-c component $U_d$ of voltage in the art 6 are separated in the voltage pick-up 9. Signals corresponding to these components $U_d$, $U_a$ go to inputs 10,11 of a comparison circuit 12. An output 13 of the comparison circuit 12 is connected to an input of an electric arc current controller 14 and to a first input of a switch 15 having a second input connecting to an output 16 of the comparison circuit 12. An output of the switch 15 is connected to one control input 17 of the welding power supply 7 having another control input 18 connected to an output of the current controller 14. An output 19 of the comparison circuit 12 is connected to a third input of the switch 15 and first input of a delay circuit 20 having a second input connected to the output 13 of the comparison circuit 12. An output of the delay circuit 20 is connected to one input of a drive starting circuit 21 having another input connected to an output 22 of the comparison circuit 12. An output of the starting circuit 21 is connected to a control input of the reciprocation drive 5.

Figure 2A:
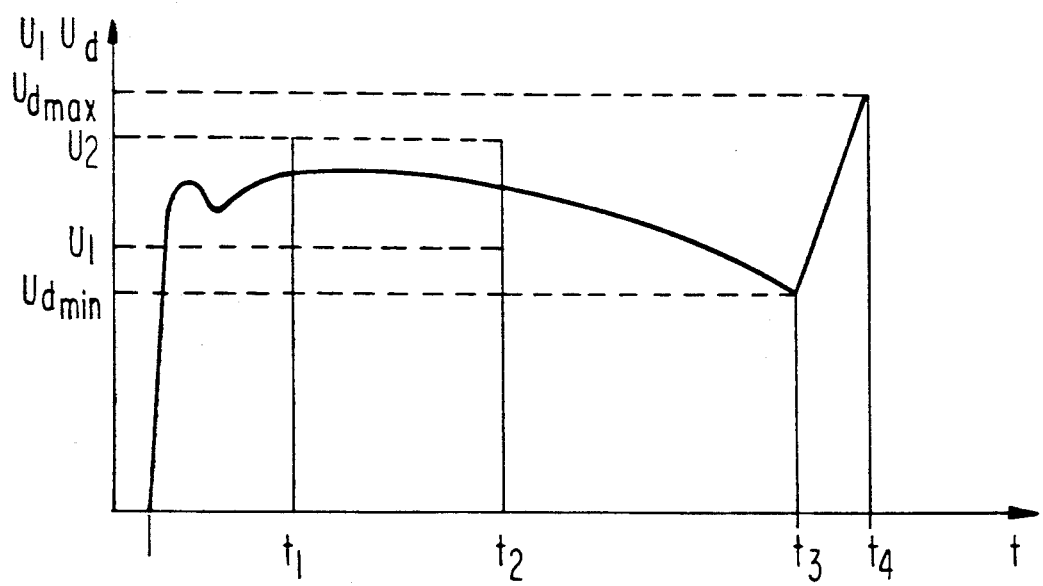
FIGS. 2a, 2b, and 2c show time-related diagrams of a d-c component of voltage of the electric arc, current of the electric arc and movement of one of the parts being welded.

For better understanding of the method according to the invention, the reference is made to FIG. 2 showing time-related diagrams of a) the d-c component $U_d$ of voltage of the electric arc; b,c) current of the electric arc (curve A) and displacement S (curved B) of one of the parts 2,3 being welded, respectively, with, and without taking into account the a-c component $U_a$ of voltage.

The method for pressure welding of parts with heating with an arc moving in magnetic field is carried out in the abovedescribed apparatus in the following manner.

The parts 2,3 being welded are placed in the clamping devices 1 (FIG. 1) coaxially with each other with a working gap δ between their ends in which the electric arc 6 is fired by applying voltage to the clamping devices 1 from the welding power supply 7.

It has been found by way of experiments that the amount of the working gap δ ranges from 1.5 to 2.0 mm and depends on the no-load voltage of the welding power supply 7. When the amount of the working gap δ goes beyond the upper limit, the electric arc 6 is interrupted, and when it goes beyond the lower limit, this results in a short circuit. In welding the parts 2,3 of low-carbon steels without a shielding gas, a value of the d-c component $U_d$ of voltage of the arc 6 ranging from 24 to 30 V corresponds to the preset working gap δ.

Concurrently with firing of the arc 6 in the working gap δ magnetic field is created in the gap by means of the magnets 4. As a result of interaction of the current of the arc 6 and magnetic field, the arc 6 moves along the perimeter of the ends of the parts 2,3 to heat them.

It has been found by way of experiments that at the beginning of the process the d-c component $U_d$ of voltage of the arc 6 increases as the arc 6 is accelerated and then starts decreasing. This decrease occurs until the beginning of fusion of the ends of the parts 2,3. On the other hand, the d-c component $U_d$ of voltage of the electric arc 6 is directly proportional to the length of the arc 6 which is determined by the amount of the working gap δ between the ends of the parts 2,3 being welded. In this case, the decrease in the value of $U_d$ is caused by a decrease in the working gap δ as a result of a thermal expansion of the parts 2,3 being welded during their heating with the arc 6. The character of change of $U_d$ with time is identical for different materials and is determined by the fraction of thermal energy spent for heating of the parts 2, 3 and depends on coefficient of thermal expasion of the material of the parts 2,3. A decrease in the d-c component $U_d$ caused by the thermal expansion may be as great as 20% of the value of $U_d$ during a sustained process (after stabilization of movement of the arc 6). As elongation of the parts 2, 3 upon their heating and a respective decrease in the working gap δ depend on heating temperature; the current value of the d-c component $U_d$ of voltage of the arc 6 may be used to assess temperature at the ends of the parts 2, 3 being welded.

A signal corresponding to a current value of voltage of the arc 6 is received by the voltage pick-up 9 and is divided in this pick-up into two signals carrying information on the d-c and a-c components $U_d$ and $U_a$ of the voltage.

In case of preliminary machining of the ends of the parts 2, 3 being welded which ensures a constant working gap δ along the perimeter thereof, the a-c component $U_a$ is low and way be neglected, the welding process being controlled in accordance with the d-c component $U_d$.

A current value of the d-c component $U_d$ of voltage of the arc 6 is fed to the input 10 of the comparison circuit 12 which generates reference signals set up to correspond to minimum $U_{d\ min}$ and maximum $U_{d\ max}$ values of the d-c component $U_d$ of voltage.

The value of $U_{d\ min}$ and $U_{d\ max}$ are determined by way of experiments, the value of $U_{d\ min}$ attesting to the heating of the ends of the parts 2, 3 to a temperature of plastic deformation, and the value of $U_{d\ max}$ attesting to the achievement of melting point of the ends.

At the same time, the comparison circuit 12 generates other reference signals $U_1$ and $U_2$ the values of which (ranging from 24 to 30 V) which are set up in advance correspond to a range of variation of the d-c component $U_d$ of voltage of the arc 6 in which the stable arc 6 occurs without interruptions and short circuit, the signals $U_1$, $U_2$ being within the range from $U_{d\ min}$ to $U_{d\ max}$ (20-40 V).

One-two seconds after the firing of the arc 6 (the time $t_1$ in FIG. 2) and when the arc 6 starts performing a sustained movement, a current value of the d-c component $U_d$ is compared with the reference signals $U_1$, $U_2$. In case $U_d$ goes beyond the limits of this range which would attest to the amount of the working gap δ going beyond the admissible range (1.5-2.0 mm), the comparison circuit 12 generates a control signal which goes from the output 16 to the second input of the switch 15 and from the switch, to the control input 17 of the welding power supply 7 for turning off the power supply. Then one of the parts 2, 3 is released, the preset working gap δ is restored, and the arc 6 is again fired and magnetic field is created.

In case a current value of $U_d$ does not go beyond the limits of the abovementioned range (24-30 V), a current value of $U_d$ is compared with the minimum value $U_{d\ min}$ of the d-c component 2-7 s (the time $t_2$ in FIG. 2a) after the firing of the arc 6.

Figure 2B:
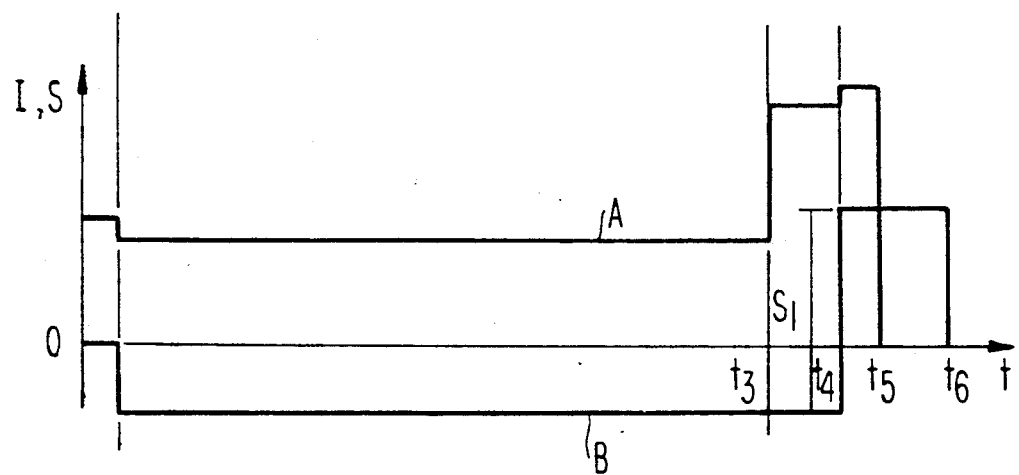
Figure 2C:
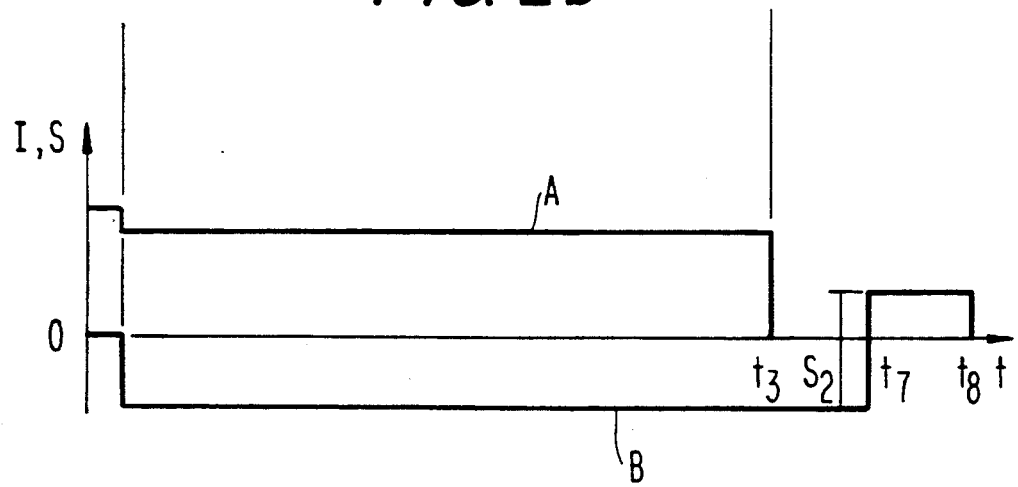

As a result of the thermal expansion of the ends of the parts 2, 3 being welded during their heating with the arc 6 the gap δ decreases with a respective decrease in the current value of the d-c component $U_d$ of voltage of the arc 6. At the moment the value of $U_d$ is equal to $U_{d\ min}$ (time $t_3$ in FIG. 2a), which attests to the heating of the ends of the parts 2, 3 being welded to a temperature of plastic deformation, the comparison circuit 12 generates a control signal which goes from the output 13 of the circuit 12 to the input of the current controller 14. A control signal from the output of the controller 14 goes to the input 18 of the welding power supply 7 so as to carry out a pulsed increase in current of the electric arc 6 (FIG. 2b, curve A).

This pulsed increase in current of the electric arc 6 results in the ends of the parts 2, 3 being welded being fused so as to cause an increase in the working gap δ therebetween.

It has been found by way of experiments that thickness of the fused layer of metal at the end of each part 2, 3 before upsetting should not exceed 0.5–0.8 mm. If the fused metal layer is thinner than 0.5 mm, oxides are not completely removed from the end face and they would not be displaced out of the joint during upsetting. If the fused metal layer thickness is greater than 0.8 mm, gradient of the temperature field is too high, and the parts 2, 3 cannot be deformed during upsetting by an amount sufficient to crush all irregularities of the surface and to displace molten metal from the joint. Welding quality is low in both former and latter cases. With an increase in the working gap δ the current value of the d-c component $U_d$ of voltage increases. As soon as signal going from the voltage pick-up 9 to the input 10 of the comparison circuit 12 and corresponding to a current value of the d-c component $U_d$ of voltage reaches its maximum value $U_{d\,max}$, a control signal is fed from the output 22 of the comparison circuit 12 to the second input of the starting circuit 21 to turn on the drive 5 for upsetting the parts 2, 3 being welded. During the upsetting, the part 3 is moved with respect to the part 2 through a distance $s_1$ (FIG. 2b, curve B) which is greater than the working gap δ and which ensures plastic deformation as a result of the engagement of the parts 2, 3 being welded (FIG. 1) which is necessary to form a welded joint. The parts 2, 3 are held pressed against each other for 2–3 s. During this period the welding power supply 7 is turned off (time $t_5$, FIG. 2b, curve A), and the parts 2, 3 are then released, and the drive 5 (FIG. 1) brings the clamping devices 1 back to the initial position (time $t_6$, FIG. 2b).

It will be apparent from the above that the method according to the invention takes into account the actual heating of the parts being welded so as to determine on the basis thereof with high accuracy the moment for a pulsed increase in the arc current and the moment for upsetting. Conditions are thus provided for taking into account random fluctuations of parameters of welding or dimensions of parts being welded so as to enhance stability of quality of welded joints.

In case parts 2, 3 being welded can have local projections or recesses, the a-c component $U_a$ of voltage in the arc 6 is also measured, which carries information on nonuniformity of local gap $δ_i$ and a limit value $U_a'$ is set up which corresponds to the case when the value of current gap $δ_i$ goes beyond the limits of the working gap δ. A signal corresponding to $U_a$ goes from the voltage pick-up 9 to the input 11 of the comparison circuit 12. This signal is compared with reference signal corresponding to the limit value $U_a'$ which is determined by way of experiments and attests to the local value of gap $δ_i$ (not shown) going beyond the limits of the working gap δ. If the signal corresponding to a current value of the a-c component $U_a$ overpasses the reference signal, a control signal goes from the output 19 of the comparison circuit 12 to the third input of the switch 15 to prepare the welding power supply 7 for turning off. The same signal goes from the output 19 of the comparison circuit 12 to the first input of the delay circuit 20. As soon as the signal corresponding to the current value of the d-c component $U_a$ of voltage decreases to the level of the respective reference signal $U_a'$, the comparison circuit 12 will send from the output 13 a control signal to the first input of the switch 15 and to second input of the delay circuit 20. If there are two control signals, the switch 15 turns off the welding power supply 7, and the delay circuit 20 generates a control signal within a time interval ($t_3$–$t_7$, FIG. 2c) which is set up in advance and which is necessary for an additional oxidation of the ends of the parts 2, 3 being welded (FIG. 1) to avoid their welding together this signal going to the input of the starting circuit 21. The starting circuit 21 turns on the drive 5 for axially moving the part 3 through a distance $s_2$ (FIG. 2c, curve B) until the ends of the parts 2, 3 touch each other for a time ($t_7$–$t_8$, FIG. 2c) necessary to cooling them down to a temperature below the temperature of plastic deformation of the material of the parts being welded. As a result of such an engagement, the irregularities on the end faces of the parts 2, 3 (FIG. 1) are leveled down. The parts 2, 3 being welded are then spaced apart by means of the drive 5, and the initial working gap δ between their ends is restored; the electric arc is then refired in the gap, and the welding method is carried out as described above.

Control of uniformity of the gap based on measurements of the a-c component of voltage of the arc $U_a$ makes it possible either to reject the parts being welded or to reduce consumption of materials for lowering part wastage by machining parts ends before welding, depending on application.

The invention will be better understood from the following specific example of its practical implementation.

Pipes 57 mm in diameter with the wall thickness of 5 mm made of low-carbon steel were placed in clamping devices of a welding plant with the working gap δ=2.0 mm.

Electric arc was fired in the working gap, and magnetic field was created by means of permanent magnets. Two seconds after when the arc started to perform a sustained movement, voltage at the arc was controlled. The d-c component of the voltage should be within the range of 24 to 28 V as defined in advance. If the d-c component went beyond the limits of this range, this attested to an incorrect setting of the working gap δ, and the control unit turned off of the welding rectifier.

The limit value of $U_a'=6$ V was set for the a-c component of the arc voltage. The values of the reference signals $U_d\,min=21$ V and $U_d\,max=35$ V were also set up in advance.

If the d-c component of the voltage $U_d$ was within this range, the ends of the parts were heated by the electric arc until the d-c component of voltage decreased to 21 V. The arc current was 250 A during the entire process period. Then a pulsed increase in the arc current to 1000 A followed so as to fuse the ends of the parts being welded, the working gap δ increased, and $U_d$ also increased. With the value of $U_d=35$ V upsetting was carried out. The velocity of movement of the parts during the upsetting was at least 150 mm/s and the upsetting force was 60 kW. The average welding time beginning with the moment of arc firing was 12 s.

An artificial local increase in the gap by 0.8 mm resulted in the welding rectifier being turned off after a decrease in the d-c component to 21 V, the arc was interrupted, and the ends of the parts were pressed against each other in 1 s. Further spacing of the parts apart to the working gap δ=2.0 mm and refiring of the arc resulted in a normal welding process being restored.

The welding method according to the invention makes it possible to ensure an automatic variation of welding time upon variation in the arc current. Thus, with a decrease in the arc current at the stage of heating of the ends to 200 A, the welding time increased to 15 s. The time of pulsed current increase in both cases was 0.2 s. The process of preliminary adjustment of welding conditions was thus facilitated so that the number of trial samples necessary for such an adjustment was reduced.

The method according to the invention ensure high stability of welding quality, the wastages not exceeding 4% of the total number of welded joints in comparison with 6% in the prior art.

INDUSTRIAL APPLICABILITY

The invention may be used in various fields of mechanical engineering in the manufacture of closed hollow parts and in the construction, in the installation of pipelines. The invention may be advantageously used in the automobile and tractor manufacture in the production of cardan shafts, torgue rods, exhaust pipes and other parts as well as in the boiler manufacture for the production of steam pipelines.

We claim:

1. A method for pressure welding of parts heated with an arc moving in a magnetic field comprising placing the parts (2,3) being welded coaxially with the working gap ($\delta$) between their ends, initiating an electric arc (6) in said gap ($\delta$) and creating a magnetic field in said gap ($\delta$) under the effect of which the electric arc (6) moves along the perimeter of the ends of the parts (2,3) being welded to heat them to a temperature of plastic deformation of the material of the parts being welded, determining the time moment when said temperature is reached after which the arc current is pulsatingly increased to the value at which the temperature of the ends of the parts being welded reaches the melting point of the material of the parts being welded, and upsetting the parts (2,3) being welded characterized in that the determination of the time moment at which the temperature of the ends of the parts being welded is essentially equal to the temperature of plastic deformation of the material of the parts being welded is carried out by measuring the d.c. component ($U_d$) of voltage of said electric arc (6) then setting the minimum value ($U_{d\ min}$) for the d.c. component ($U_d$) at which the temperature of the ends of the parts being welded is essentially equal to the temperature of plastic deformation of the material of the parts being welded and, as the d.c. component ($U_d$) of voltage of the electric arc (6) reaches its minimum value ($U_{d\ min}$), the arc current is pulsatingly increased.

2. A method as claimed in claim 1 characterized in that it comprises setting a maximum value ($U_{d\ max}$) for the d.c. component ($U_d$) of voltage of the electric arc (6) at which the ends of the parts (2,3) being welded start melting and upsetting the parts (2,3) being welded when a maximum value ($U_{d\ max}$) of the d.c. component ($U_d$) of voltage of the arc (6) is reached.

3. A method as claimed in claims 1 or 2 characterized in that it comprises determining the size of the local gap ($\delta_i$) along the perimeter of the ends of the parts (2,3) being welded within the time interval from firing of electric arc (6) to the moment when the d.c. component ($U_d$) of voltage of the electric arc (6) reaches its minimum value ($U_{d\ min}$) and, as the size of the local gap ($\delta_i$) goes beyond the working gap ($\delta$), extinguishing said arc (6), bringing the parts (2,3) being welded axially closer to each other until their ends contact each other for a time necessary to cool them down to a temperature below the temperature of plastic deformation of the material of the parts being welded, then moving parts (2,3) apart to the initial size of the working gap ($\delta$) and refiring said arc (6) therein.

4. A method as claimed in claim 3 characterized in that the size of the local gap ($\delta_i$) is determined over the perimeter of the parts (2,3) being welded by measuring the a.c. component ($U_a$) of voltage of the electric arc (6) and setting for it a limit value ($U_a'$) corresponding to the value by which the local gap ($\delta_i$) goes beyond the limits of the working gap ($\delta$).

* * * * *